United States Patent [19]

Maloney

[11] 4,355,682

[45] Oct. 26, 1982

[54] ENVIRONMENTALLY DRIVEN HEATING AND COOLING SYSTEM

[75] Inventor: Timothy Maloney, Winchester, Va.

[73] Assignee: One Design, Inc., Winchester, Va.

[21] Appl. No.: 179,240

[22] Filed: Aug. 18, 1980

Related U.S. Application Data

[62] Division of Ser. No. 941,735, Sep. 12, 1978, Pat. No. 4,257,477.

[51] Int. Cl.³ .............................................. F25B 29/00
[52] U.S. Cl. ................... 165/48 S; 165/49; 165/53; 126/400; 126/426; 126/430; 126/431
[58] Field of Search ........... 165/48 S, 49, 53, DIG. 4, 165/76; 126/400, 419, 426, 428, 430, 431, 436, 449, DIG. 1

[56] References Cited

U.S. PATENT DOCUMENTS

| | | | |
|---|---|---|---|
| 3,563,305 | 2/1971 | Hay | 165/49 X |
| 4,051,891 | 10/1977 | Harrison | 165/54 |
| 4,064,648 | 12/1977 | Cary | 165/1 X |
| 4,162,671 | 7/1979 | Christy | 126/400 |

OTHER PUBLICATIONS

Popular Science, "Solar Battery for Passive Heating", by Edward Moran, pp. 44–45.
*Design for a Limited Planet,* Skurka and Naar, pp. 147-148, Ballantine Books, 1976.
*Energy Environment and Building,* Steadman, pp. 45–49, Cambridge Univ. Press, 1975.

*Primary Examiner*—Samuel Scott
*Assistant Examiner*—Margaret A. Focarino
*Attorney, Agent, or Firm*—Finnegan, Henderson, Farabow, Garrett & Dunner

[57] ABSTRACT

Heat is transferred to and from a building having a stack or other group of containers for thermal storage mass, arranged to be illuminated directly or indirectly by sunlight, via a frontally spaced sun swept glazing system. A connection path is established through the glazing to module space and a shade system is provided for modulating heat transfer. For cooling, warmest water may be removed from the modules, spray cooled and circulated back to coolest modules. Designs for field-erectable modules are disclosed.

12 Claims, 21 Drawing Figures

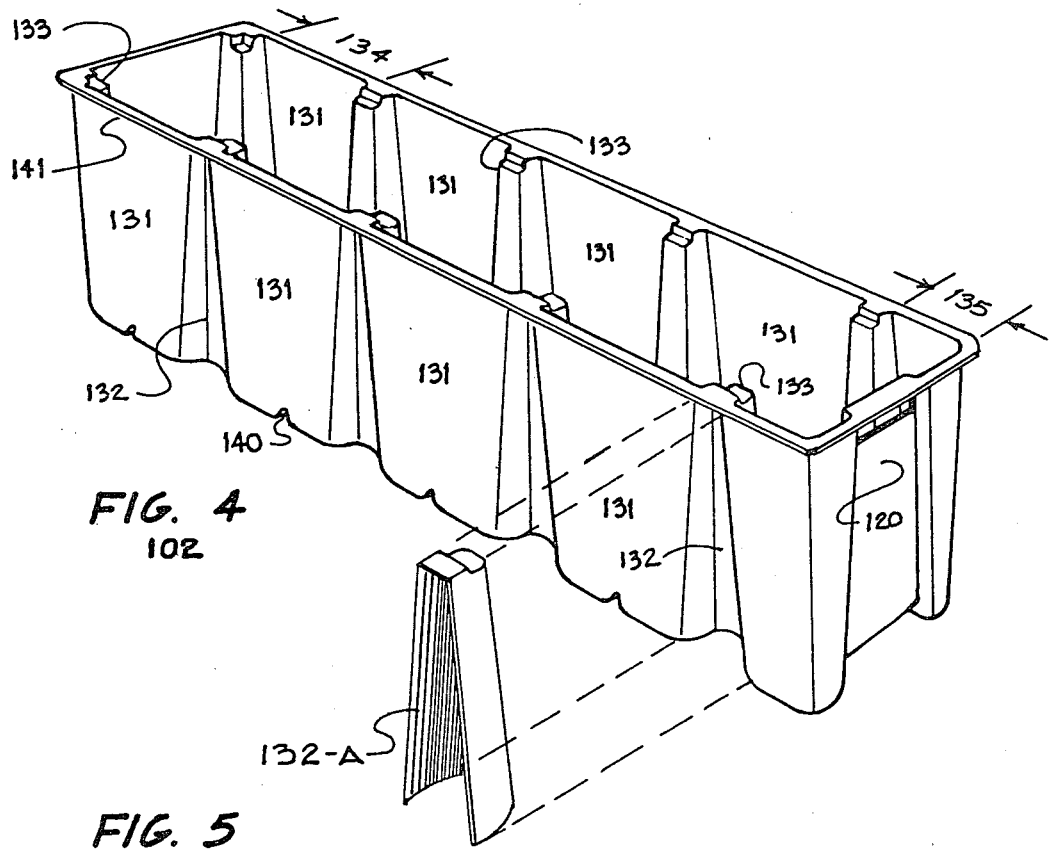
FIG. 4
102
FIG. 5
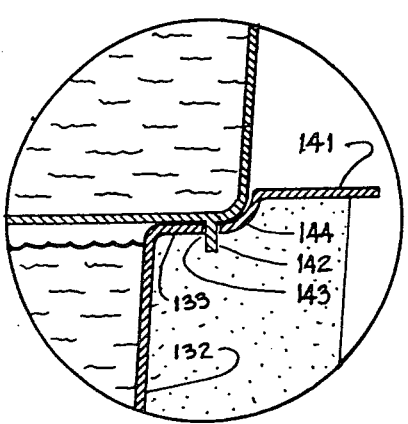
FIG. 6
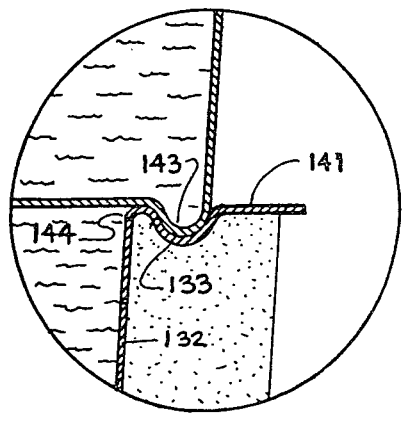
FIG. 7

ENVIRONMENTALLY DRIVEN HEATING AND COOLING SYSTEM

This is a division, of application Ser. No. 941,735 filed Sept. 12, 1978, now U.S. Pat. No. 4,257,477.

BACKGROUND OF THE INVENTION

Recently, there have been published a number of books which survey the present state of the art of solar heating and cooling of buildings. Noteworthy are:

The Solar Home Book, heating, cooling and designing with the sun, Bruce Anderson with Michael Riordan, Cheshire Books, Hanesville, N.H. (1976); and Designing and Building a Solar House, Your Place in the Sun, Donald Watson, Garden Way Publishing, Charlotte, Vt. (1977).

Particularly of interest in the Anderson book are the following topics:

M.I.T. Solar House II (1947), pp. 23, 24; Telkes et al—Dover House (1948), pp. 24, 25; Jonathan Hammond—Winters House (1974), pp. 40–42, 181; Chapter 4—Direct Solar Heating, pp. 76–113; Wright House (1974), pp. 108, 109; Odillo House 1962 (1962), p. 129; Zomeworks—Baer House (1971-1972), pp. 129–133, 181; Kalwall Corp. "Sun-Lite" storage wall collectors, pp. 133, 240, 241; Harold Hay/Sky Therm Process and Engineering—Solar Architecture House (1973), pp. 133, 137, Phoenix Test Building (1967), pp. 135–137, Sky Therm North, p. 140; Total Environmental Action—Jackson Freese House, p. 140; Day Chahroudi—Subfloor Heat Storage, p. 142; Small Containers of Water, p. 188, 189; Solar Cooling, p. 197, 198; Bill and Susan Yanda—Solar Sustenance, pp. 233–239; Jonathan Hammond—Hammond House (1975), pp. 239–241.

Particularly of interest in the Watson book are the following topics:

M.I.T. Solar House II (1947), pp. 6, 7; Telkes et al—Dover House (1948), pp. 6, 7; Wright House (1974), p. 29; Zomeworks—Bear House (1971-1972), pp. 35, 45; Kalwall Corp. "Sun-Lite" storage wall collectors, p. 38; Harold Hay/Sky Therm Process and Engineering—Solar Architecture House (1973), pp. 31, 38–40, 47–49; Other Window Collector Designs, p. 30; Bill Mingenbach, p. 38; Prof. Shawn Buckley/M.I.T.—Thermic Diode Solar Building Panels, pp. 41, 42; J. D. Balcomb and J. C. Hedstrom—Simulation Analysis of Passive Solar Heated Buildings, Los Alamos Scientific Laboratory, p. 48; Selecting a Solar Heating Approach, pp. 172–174.

Both books contain extensive bibliographies and appendices of interest.

SUMMARY OF THE INVENTION

The system of the present invention was developed in response to a need for simple, marketable ways and means of introducing thermal storage mass into structures, while providing direct contact with the environmental drive systems as well as with the conditioned space. It provides an interface between the environment and end users.

A principal improvement provided by the present invention is simplicity of fabrication, installation and operation. In the heating mode, generally there are no moving parts. In the cooling mode some climates require the use of a circulating pump. Others do not.

Simplicity of installation and the elimination of those maintenance issues associated with traditional solar heating and cooling systems, is a valuable contribution of this system. Elimination of high operating temperatures enables the system to be more sensitive to heat gain, less subject to high temperature degradation, less prone to mechanical failure and less expensive to buy and operate.

The system replaces the following components previously associated with space conditioning: heat exchanging systems at the points of collection, storage and delivery; storage remote from collection; electric control systems (in many applications); all moving parts (except in some cooling climates); and market resistance, by virtue of direct simplicity.

The system provided by the invention has the greatest mass per square foot of sun aperture per unit of dedicated floor area known to the inventor.

The heating and cooling modes are based upon different technologies which can be used separately or jointly. Their joint use is a particularly efficient combination, but some climates require one without the other.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

FIG. 4 is a perspective view of one horizontally extensive heat storage modules (in an empty condition);

FIG. 5 is a perspective view of an add-on support rib block for use, in plurality, with the module of FIG. 4;

FIG. 6 is a fragmentary transverse vertical cross-sectional view on a larger scale, showing two of the modules, one stacked on the other;

FIG. 7 is a fragmentary transverse cross-sectional view similar to FIG. 6, but of an alternative construction;

DETAILED DESCRIPTION OF PRESENTLY PREFERRED EMBODIMENTS OF THE INVENTION

Figure 11:
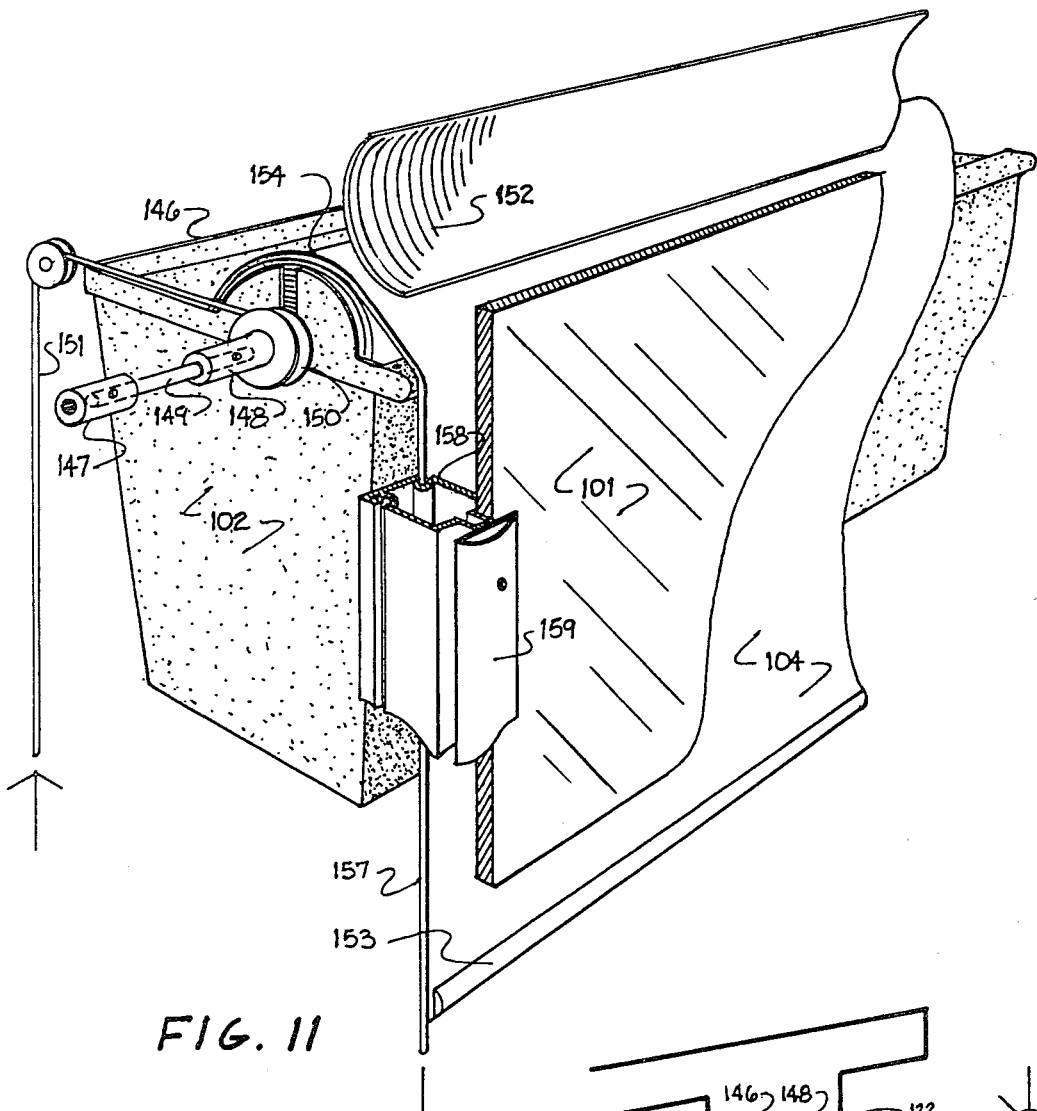
FIG. 11 is a fragmentary perspective view, on a larger scale, of an upper portion of the apparatus of FIG. 1.

The system of the present invention is capable of receiving a variety of mechanical expressions, some of which are illustrated herein to suggest the breadth of the invention.

By preference, the present invention makes use of a plurality of basic component (i.e. modular) containers, filled with thermal storage mass deployed within a structure to allow sunlight to fall directly or indirectly on the modules through a glazing system. The surfaces of the modules act as a solar collector, and as a radiator of collected and stored energy to the rooms of a structure.

In its heating mode, the system typically functions as follows.

The winter sun 100 (FIG. 1) shines through glazing system 101 onto modules 102, causing energy to be absorbed by the storage material such as water, sand, or phase change materials like Glauber's salt or calcium chloride. The temperature of this material is a function of the quantity of sun, the transparency of the glazing system and the quantity storage medium as well as the chemical make-up of the storage medium. Altering the thickness 103 of the modules 102 alters the temperature of the storage mass. A movable insulation device 104 can be introduced when the sun does not shine to reduce outward losses of stored energy. The heat thus collected is radiated through cosmetic finish panel 105, if any is employed. When such a panel is used, it may have a vent 106 at the bottom and another, 107, at the top, thereby creating a convective air chimney 108, which also removes heat from storage. Air in the cavity 108 is heated and rises out through top vent 107, drawing cooler air off the floor through bottom vent 106.

With the coming of summer, the sun gradually assumes a new relationship to the wall by rising higher in the sky. Architectural overhangs 108 and/or roller shade 104 block the sun from heating the storage mass contained in modules 102. Modules 102 no longer absorb solar radiation, but can absorb heat from within the building if the storage medium is kept below the desired room temperature.

Then, in the cooling mode of the system, cooling may be accomplished in at least one of two ways depending on local climate.

If the nights are cool enough, vent 109 at the bottom of the south wall is opened as well as vent 110 at the top of the wall, thus admitting cool night air into cavity 111 where it is heated by the daytime excess heat stored in modules 102. It passes upward and out through vent 110, thereby lowering the temperature of storage enabling it to cool the building the following day or days.

However, many climates do not offer this cool night circumstance. In those climates which include most of the U.S., additional means must be taken to reduce the water temperature.

Figure 2:
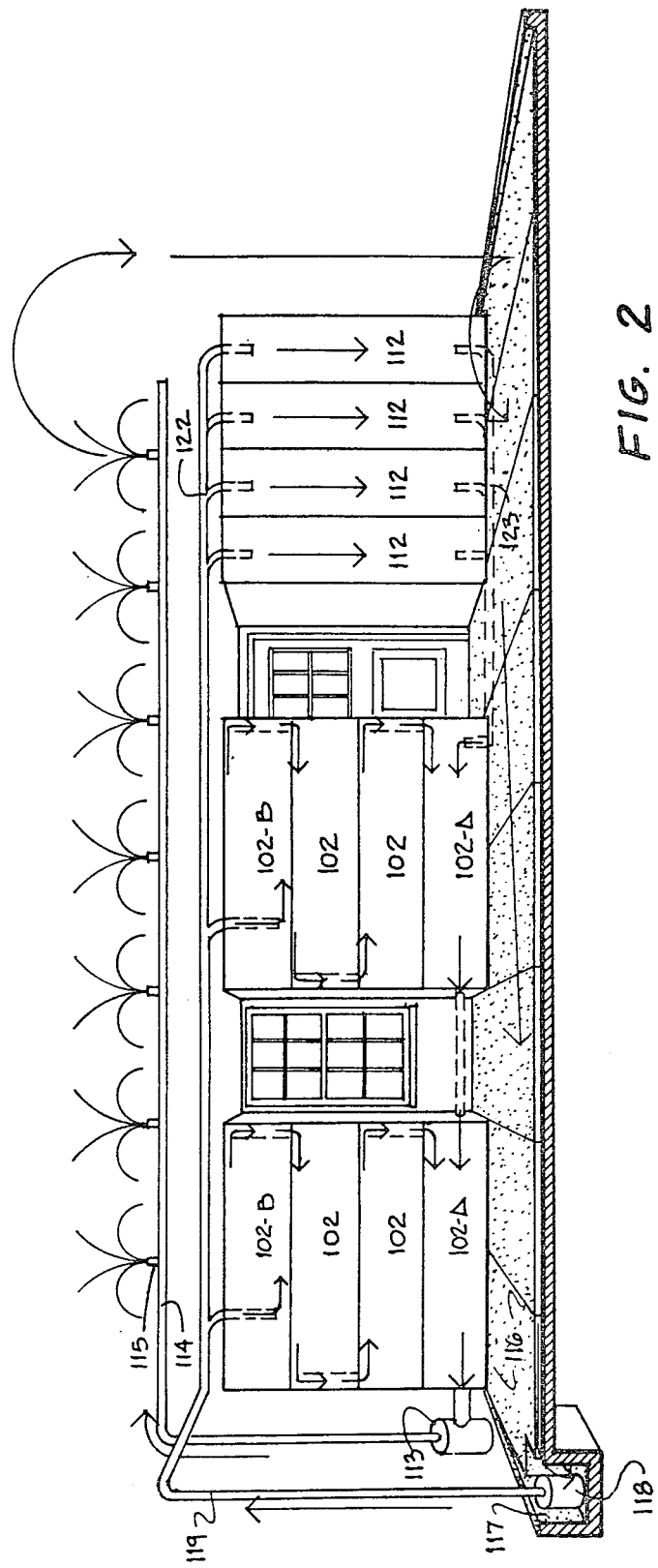
FIG. 2 is a frontal perspective view from the exterior, of a collecting wall employing principles of the present invention.

FIG. 2 shows how modules can be incorporated in a system to facilitate removing a liquid storage medium like water, spraying it into the air outside the building, thereby reducing its temperature at least to the temperature of the air if not lower, and then returning the cooled medium to storage.

Figure 9:
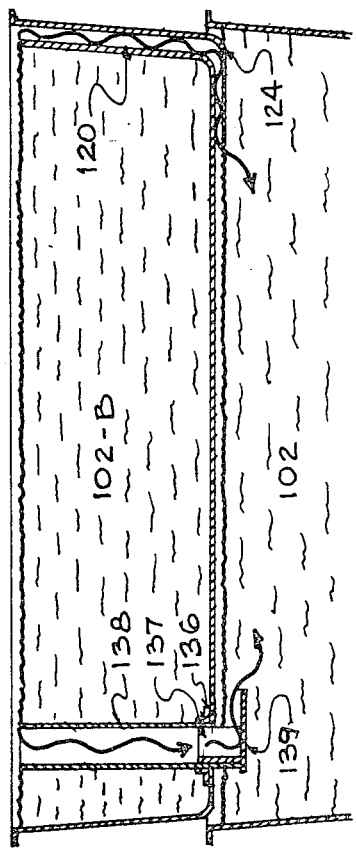
FIG. 9 is a fragmentary vertical sectional view showing two of the modules, one stacked on the other, the upper one being shown provided with two types of overflow mechanisms.

In FIG. 2, heat storage fluid filled modules 102 can be deployed on a south wall interrupted by windows and the like. Modules 102 are horizontally stacked, reducing the water pressure at any one point very significantly over the similar but vertically extensive modules 112. In the cascade system depicted, module 102A keeps pump 113 primed. When the pump is turned on automatically or manually, fluid from module 102A is raised up to pipe 114 with spray orifices 115 arranged so that any fluid sprayed from them falls via gravity to modules 102B and/or modules 112, depending which is used. This requires that the surface that catches the fluid be arranged above the level of modules 102B thereby allowing the fluid to fall back via gravity. In the event this is not practical, a catch surface 116 can be installed on the ground or elsewhere to collect the material as it falls from orifices 115. This surface 116 can double as a winter solar energy intensifying reflector if it is placed at the foot of the collecting wall (see FIG. 1). Catch surface 116 has a sump 117, which fills with the collected fluid (e.g. water). Pump 118 is turned on automatically or manually and the collected water is pumped into the bottom of modules 102B via pipe 119. Since module 102B is already filled, the hotter water overflows across weir 120 (FIG. 9). It falls downward until it strikes horizontal deflector 121 where it is turned and slowed and mixes with the warmest water stratified at the top of the next module 102 below. This module, similarly equipped, also begins to overflow its warmest water in combination with the warmest water from the unit above. This cascade effect continues until the warmest water from all the modules in the stacks finds its way to the bottom modules 102A, where the pump 113 takes it up to the cooling spray. This selective movement of the hottest water first, reduces the time required to get the hot water out and cooled without mixing the cooled water unnecessarily with the water which is not yet cooled. This is important because on the hottest nights of the summer, in many climates, the low ambient temperature for the night has very short duration. If this short duration of low ambient temperature is used for cooling the water in storage, then the water must be sprayed during that short period. This cascade system has the added benefit of eliminating extraneous mechanical (e.g. plumbing) inner connections and creates a tall collector wall stack without exceeding a foot or two of water head per module, thereby reducing the stresses on the modules due to internal hydraulic pressure. The labor of inner connection is also eliminated at the installation site. In modules 112, top header 122 sucks the warmest water out the top of modules 112, sprays it as described above and returns it via bottom header 123.

Figure 3:
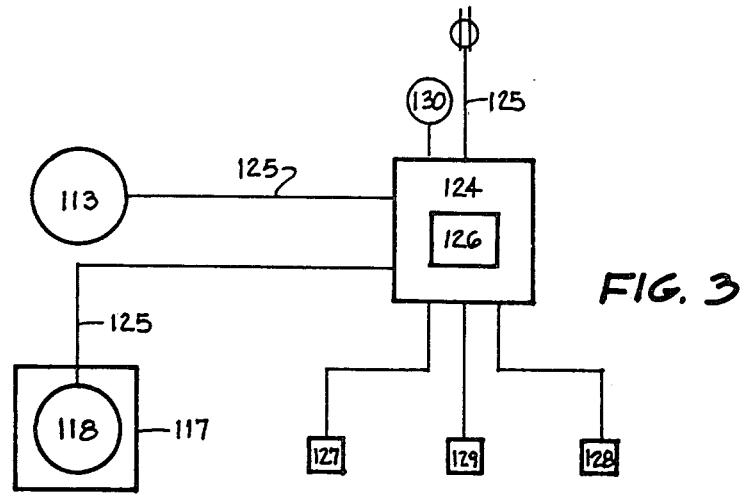
FIG. 3 is a typical schematic circuit diagram for an automatic control system useful in connection with the arrangement of apparatus shown in FIG. 2.

Referring to the typical schematic showing in FIG. 3, the automatic control for the system 124 includes a power supply 125, a logic circuit 126, temperature sensors 127, 128, 129, respectively for outside air, inside air, water, and timer 130. The four variables preferably have factory-set dials that are adjusted for individual climates. The logic circuit 126 determines if it is the cooling season, if the water needs to be actively cooled vs. convectively cooled, what the time of day is (preferably the logic circuit is programmed to wait for the statistically-preferred near-4 a.m. opportunity), and what the outside temperature is. When all the prerequisites are met, the circuit is energized and turns on pump 113 (FIG. 2). (Pump 118 has a float valve and does not turn on until sump 117 is filled). Pump 113 is turned off when the water temperature is sufficiently low or the ambient temperature rises above a preselected design temperature, or when a preselected time interval is exceeded.

The control unit logic circuit may also contain all the elements to open and close movable insulation panels which alternatively admit sunlight and restrict the outward flow of heat already collected, (example given below).

Many configurations of modules 102, etc. could serve in a system of the above description. Some are presented here for exemplification.

FIG. 4 shows one possible configuration. It might be manufactured from any number of plastic materials such as fiber-reinforced polyester, thermoplastics, papier-mache, sheet metal, etc. Fiber-reinforced concrete is a preferred material. The side walls 131 have corrugations, convolutions, ribs 132 or related built-in stiffeners to reinforce the side walls enough to carry the weight of similar or identical units stacked on top (see FIGS. 1 and 6).

In instances where strength of material considerations suggest that the side walls of the modules, at all level, or in the bottom level or so, add-on support blocks 132A may be complementarily seated in and secured in the ribs 132, as shown in FIG. 5.

Figure 8:
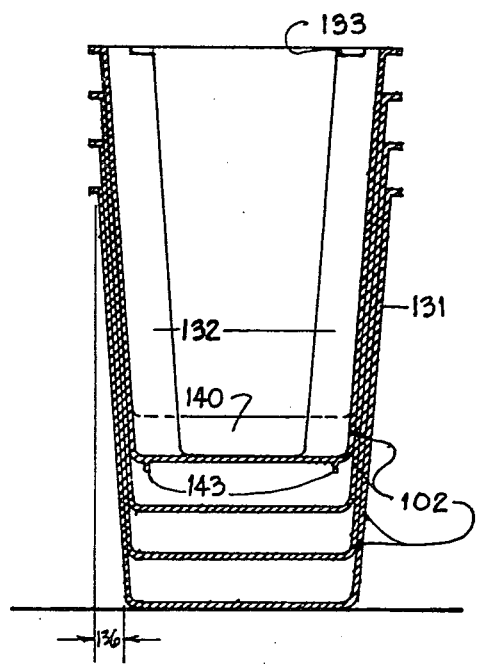
FIG. 8 is a transverse cross-sectional view showing four of the modules, nested.

FIG. 8 shows how these units 102 can nest to simplify shipping, warehousing, and handling. At the tops of some or all of the reinforcing ribs is a seat 133, against which the bottom of the next unit 102 up will rest. The units must stack as in FIGS. 1 and 6 as well as nest as in FIG. 8. The corrugations are therefore placed asymmetrically across the length of the module. Dimension 134 does not equal dimension 135. Identical units 102 nest by virtue of the comparable draft 136 (FIG. 8) in all generally vertical side wall surfaces of the modules. However, when a module is unnested from a FIG. 8 disposition and turned end for end relative to the module below it, the corrugations 132 no longer align, and the bottom edge 136 now rests against seats 133.

The overflow cascade shown in FIG. 9 would, if it were to remain in place, preclude complete nesting. A flange 123 (FIG. 9) installed in the bottom of the unit 102B over a hole 137 in the bottom of the module does not interfere with nesting. A standpipe 138 can be inserted into the flange 123 during installation, providing an overflow for the cascade described above. A water deflector 139 similar to deflector 121 could be used under the flange 123 and standpipe 138.

Depending on the material used, the module may require additional reinforcing ribs 140 across the bottom. These reduce any tendency of the bottom to sag across its width. Flange 141 stiffens the upper edge of this module by acting 90° out of the vertical plane. Stacking seat 133 (FIGS. 4, 6 and 7) not only dramatically reinforces the side walls, but also creates a seat for the module 102 stacked above. Hole 142 receives leg 143 and the modules 102 in a stack are kept from shifting not only by this configuration, but also by a shoulder 144. Further support or stabilizing may be provided by clips 145 attaching the modules to the glazing supports on the south side and/or to the interior finish wall supports on the north side (the glazing mullions and the paneling studs).

Figure 10:
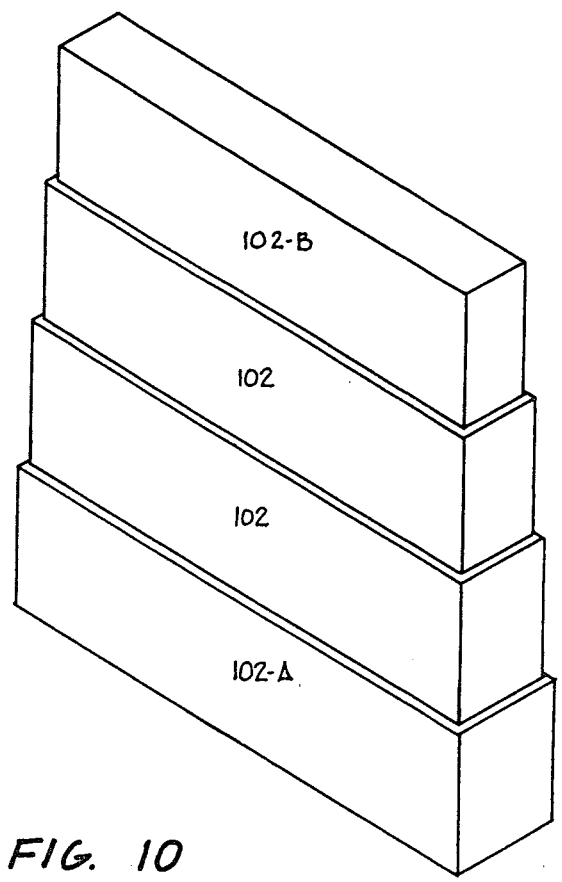
FIG. 10 is an isometric view, similar to FIG. 2, but of a modification of the apparatus in which the uppermost modules starting at 102B' are smaller in size and volume than the respectively successive next lower modules.

When desirable from strength of materials, stress and/or non-turbulent flow conditions for the cascade, the upper row or so of modules 102B' may be made physically smaller in size and volume as shown in FIG. 10. In the depicted example, each unit in the stack, in this instance proceeding up the stack, is shown being both shorter and shinner than the unit immediately below it, and thus of smaller volume. This progression in size and volume, e.g., will allow the modules to nest inside of each other to facilitate shipping.

Figure 1:
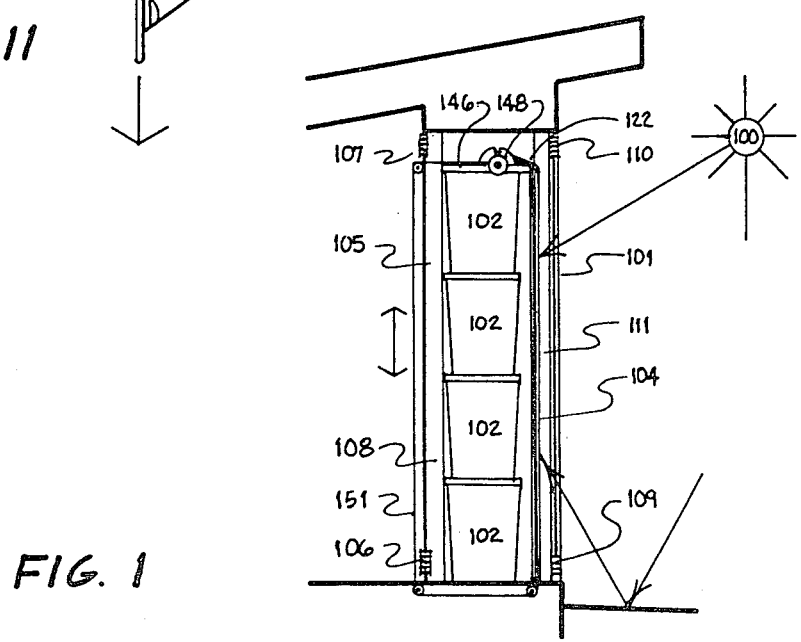
FIG. 1 is a vertical cross-sectional view of the south wall of a building provided with an environmentally driven heating and cooling system incorporating principles of the present invention.

FIGS. 1 and 11 show a movable insulation shade 104 used to inhibit heat flow outward in winter and inward in summer. This device can be mounted to pull up over the glass from the bottom, from the side toward the middle, or down from the top of the glazing toward the bottom.

FIG. 11 shows a configuration of a lid 146 for the uppermost unit 102 in a south wall stack incorporating a unique roller shade device 104. This lid unit makes any stack capable of receiving a multiple layer insulating shade 154 (also FIG. 12) to reduce reradiation from storage outwards through the glazing 101. The shade also reduces heat gain in the summer months.

The ends 147 of the shade storage roller 148 are capable of receiving a variable length coupling 149 which can join the shade roller 148 of one module stack to the shade roller 148 of the next one so that the rollers 148 of all stacks in one wall are interconnected for common operation. A pulley 150 affixed to at least one roller 148 enables a cord 151 to be pulled upwards or downwards to operate the rollers from a distance, either manually or automatically. Means for effecting automatic operation can be directly connected to the roller shaft 147, 149. Flap seal 152 is secured along an upper edge to the building and has a free lower edge trailing into brushing contact with the shade upon the roller, and thus precludes convective currents at the top of the shade. Shade bottom hem 153 is preferably of "bean bag" constitution, accomplishing a convective seal at the bottom of the insulation shade 154 when in the fully drawn down position against the floor 155. The shade vertical edges 156 are shown in FIG. 11 sealed by a cord welt 157 which is led in a groove 158 in the glazing mullion 159, or otherwise supported.

Figure 12:
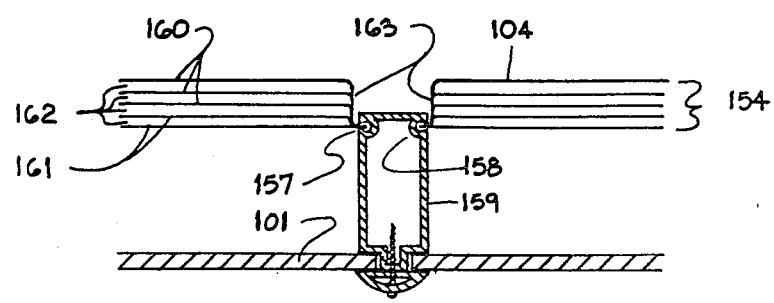
FIG. 12 is a fragmentary horizontal cross-sectional view showing glazing shades and a mullion for use with a collecting wall incorporating principles of the present invention.

FIG. 12 shows a typical multiple layer construction for the roller shade 154. The outer layer(s) 160 incorporate ultraviolet light inhibitors for long life and are reflective to reject summer heat. Inner layer(s) 161 are reflective on the inside to retard outward radiation in the winter heating mode. A cord welt 157 is fastened to the shade 154 along the length of its vertical edges. The welt 157 travels in a slideway 158 which is attached to or integrally extruded into the vertical glazing mullion 159 as shown. The slideway 158 seals the vertical edges of the shade 154 from convective air flow. By attaching the cord welt 157 to only one layer of the multiple layer shade, the air spaces 162 between the layers are allowed to breathe air through their open sides 163. The breathing characteristic allows the air between the layers to escape easily when the shade is rolled up and allows air to reenter easily when the shade is rolled down, thus filling out the air cavities to their most advantageous distance from one another as determined by a fixed spreader 22 at the top and bottom of the shade. The vertical glazing mullion 159 serves not only as a seal for the insulating shade, but also as a support for the glazing 101 and in some cases carries the weight of the roof.

In some configurations (e.g. as in FIG. 11) the glazing mullion may be contiguous to the stack of heat storing modules 102. In this form it also serves to reinforce the sides of the modules.

Figure 13:
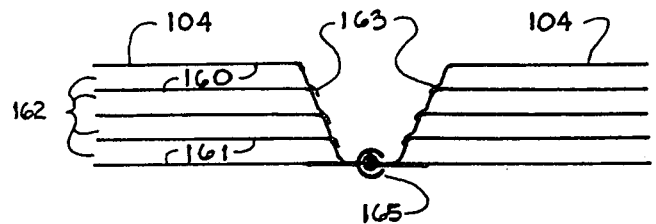
FIG. 13 is a fragmentary horizontal cross-sectional view showing a variation for the apparatus depicted in FIG. 12.

FIG. 13 shows an alternative way of attaching the edge of one insulating shade 104 to the edge of another. The technique here relies on a physical attachment of one to the other. A zipper or snap-together extrusion 165 or any male/female connection is fastened to the edges of the insulating shade.

Figure 14:
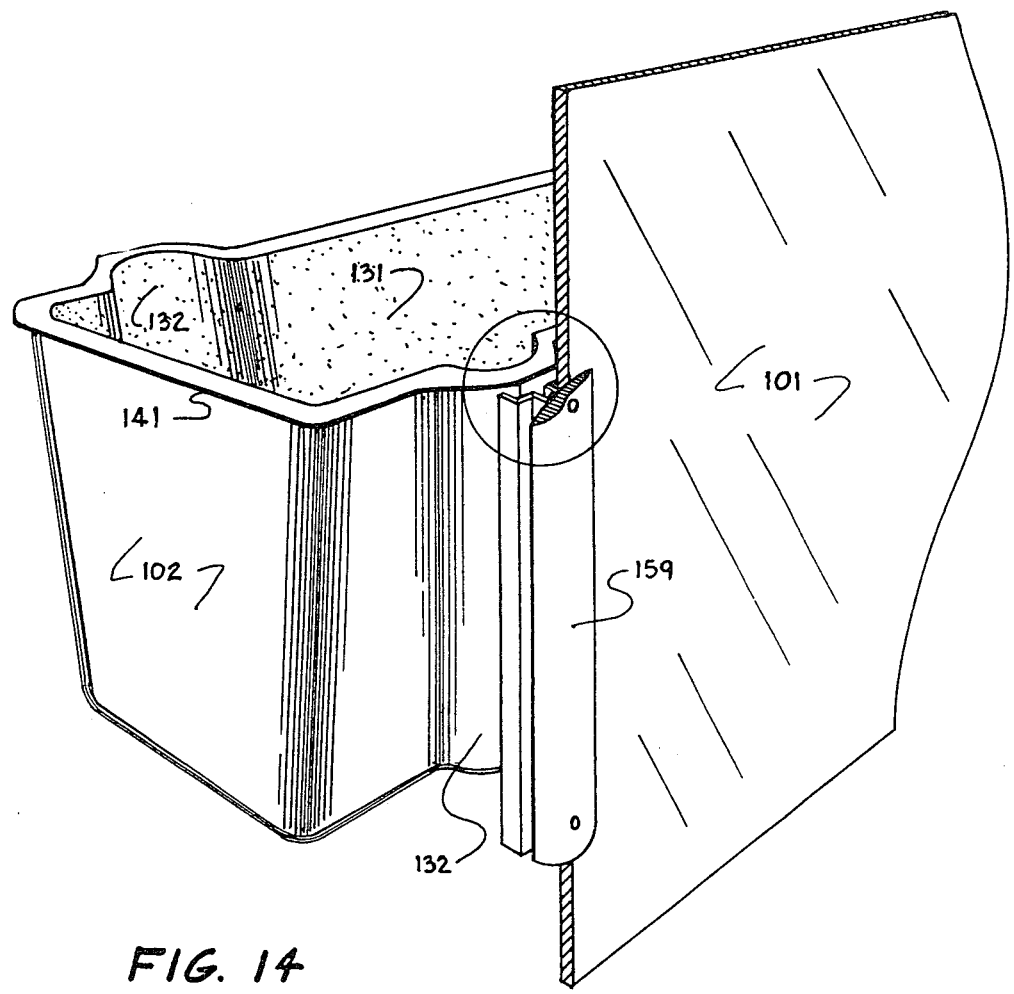
FIG. 14 depicts in fragmentary perspective, a variation of what is shown in FIGS. 4, 12 and 13, and in which the glazing mullion/shade fastener is formed integrally with the respective modules.
Figure 21:
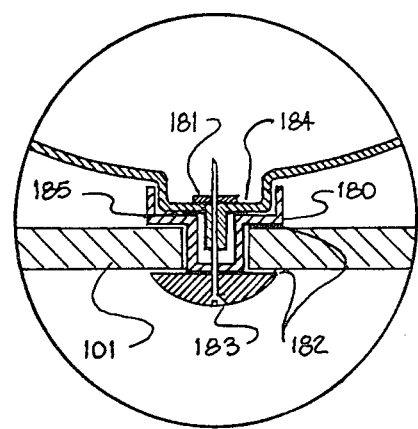
FIG. 21 is an enlarged-scale horizontal cross-sectional view of a glazing system which is attached directly to the water modules as in FIG. 14.

FIG. 14 depicts in fragmentary perspective, a variation of what is shown in FIGS. 4, 12 and 13, and in which the glazing mullion 159 is formed integrally with the respective modules 102/102', so that glazing 101 can be attached directly to the modules.

Figure 15:
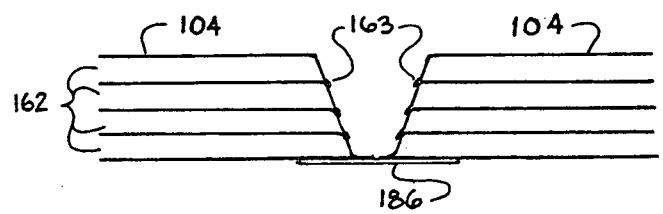
FIG. 15 depicts in fragmentary perspective, a variation of what is shown in FIG. 13, and in which the adjoining shades are interconnected by use of a strip of adhesive tape or other form of binding attachment.

Another alternative, shown in FIG. 15, is to use an adhesive or an adhesive tape to join the edge of one shade 104 to another.

Figure 16:
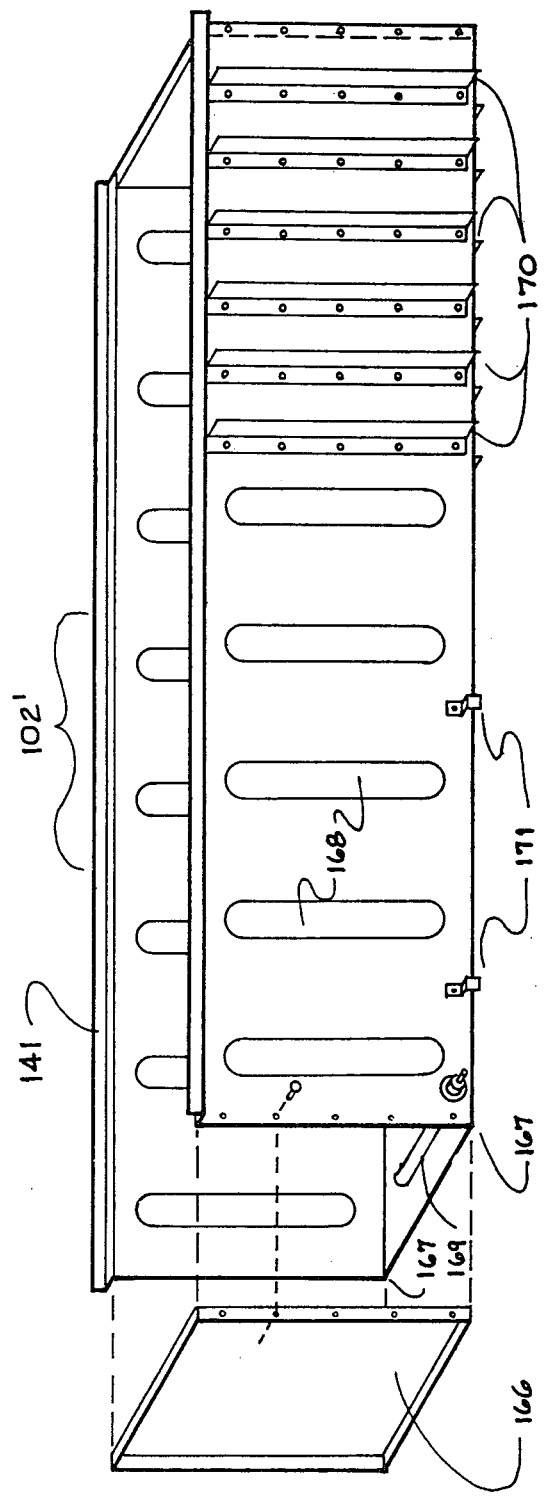
FIG. 16 is an exploded perspective view of an alternative form of module for the collecting wall.

For the purpose of illustrating the breadth of this invention, another possible configuration for a stacking module 102' is shown in FIG. 16.

FIG. 16 shows a known-down module 102' that can be shipped flat, with end panels 166 not installed. Upon delivery, bends 167 are made to erect the sidewalls relative to the bottom, and end panels 166 are riveted, screwed or soldered into place. In the case of riveting, a joint sealer is then applied to the seams, e.g. by slush-coating the interior of the module. Corrugations 168 are manufactured into the sides and corrugations 169 are manufactured into the bottom. Instead of or in addition thereto, reinforcement ribs 170 can be factory-attached flat against what will become the exterior of the sides and bottom of the module and bent out to the positions shown during installation. They provide reinforcement to the sides which together with end panels 166 help to carry the weight of the stack. The ribs also enhance radiant heat exchange between the module and its environment. As shown, the ribs are relieved at the corner edges 167, in order to permit the modules 102' to be stacked without crushing the ribs. Top edge flange 141; reinforces the top edge as well as providing a seat for the module 102' which will be stacked on top of it. Locking catches 171 engage the top edge flange 141' of the unit 102' stacked below, with the purpose of holding the top edges of the unit below firmly against the bottom edge of the unit above.

Figure 17:
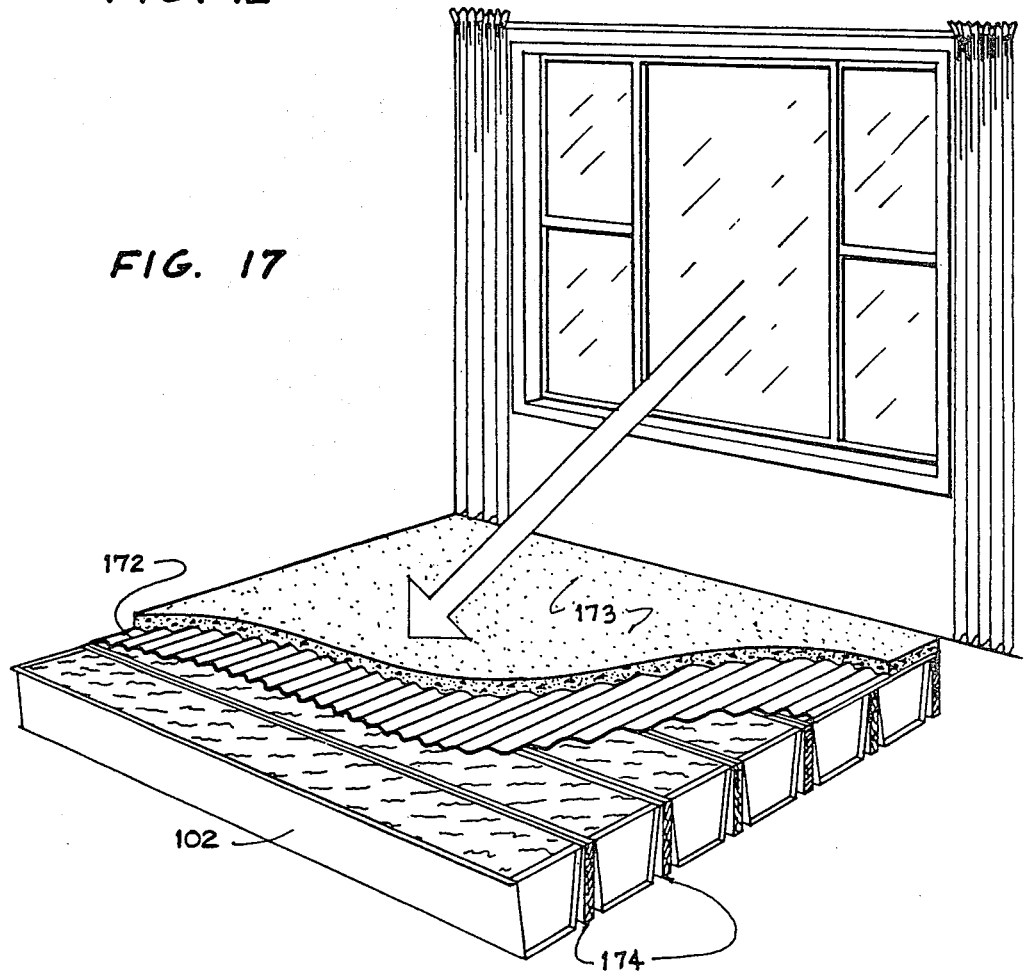
FIG. 17 is a fragmentary, cutaway perspective view of an instance wherein the collecting "wall" comprises a floor accessible to sunlight via an adjacent window.

FIG. 17 shows the modules 102 and/or 102' arranged side-by-side in a "horizontal stack" in a floor layout rather than in a wall configuration. Any flooring system can be used over the top of the horizontal stack, but a traditional corrugated metal deck 172 conducts heat well and can be covered with a masonry wearing surface 173. The modules may be placed between floor supporting joists 174 or hung on them if required.

Figure 18:
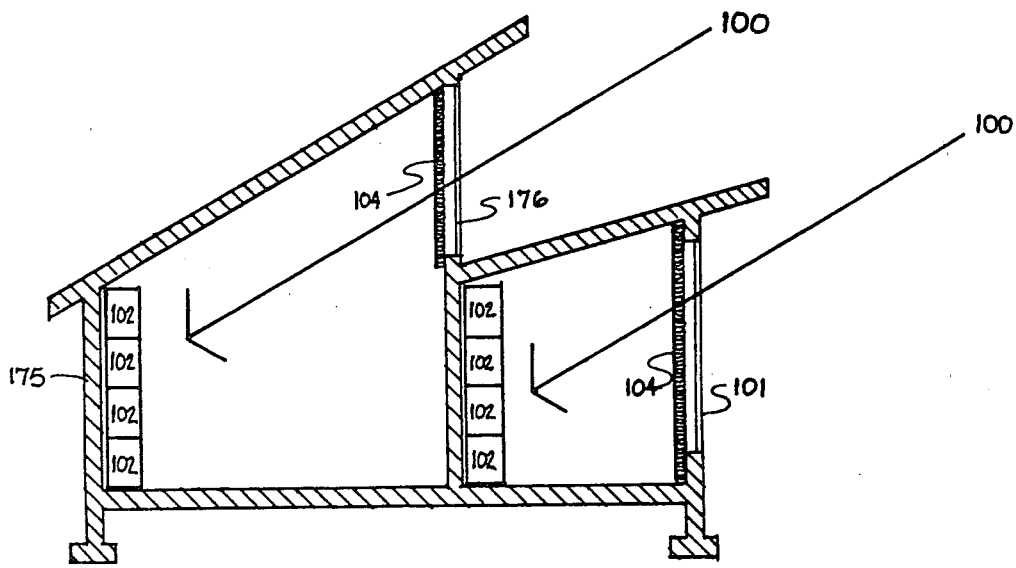
FIG. 18 is a longitudinal sectional view similar to FIG. 1, but of an instance in which the building faces north, and the collecting wall is a rear wall served by a glazed roof aperture.

A further way of advantageous use is to place the module 102 and/or 102' stacks at the north wall 175 of the structure (FIG. 18) with sunlight 100 admitted through glazed roof apertures 176. The movable insulation curtain 104; is, in that case, installed to insulate the roof aperture 176, rather than the wall as described in relation to FIG. 1. This demonstrates that the stack can also be placed anywhere within the building in conjunction with roof or wall apertures. For instance, an installation would look and operate much like what is depicted in FIG. 18, if wall 175 were, instead, an interior wall of the building.

Figure 19:
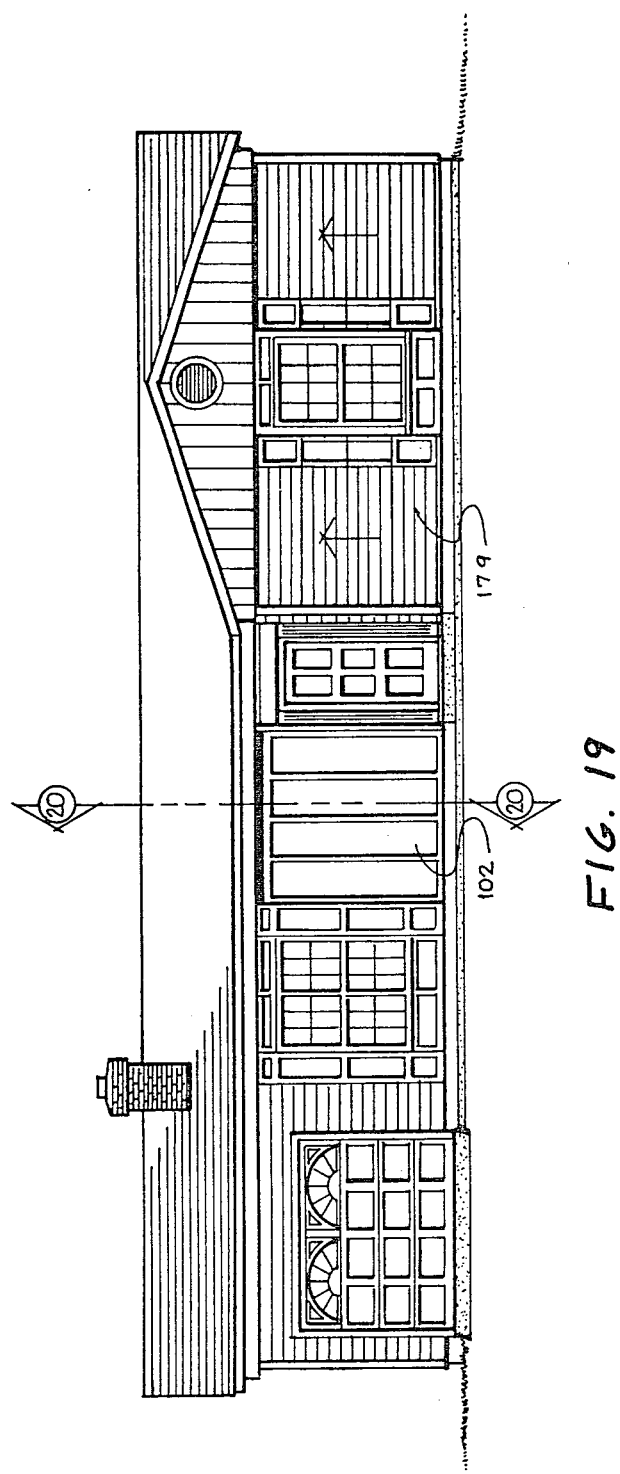
FIG. 19 is a front elevational view of a south-facing house provided with three collecting wall stacks of modules 102 and/or 102' as described in relation to FIGS. 1–16 and 18, but for the provision of exterior, raisable panels, one of which shown raised, for service similar to that of curtains 104, 104'.

FIG. 19 is a front elevation view of a south-facing house provided with three collecting wall stacks of modules 102 and/or 102' as described in relation to FIG. 1–16 and 18, but for provision of exterior, raisable panels, one of which shown raised, for service similar to that of curtain 104, 104'.

Figure 20:
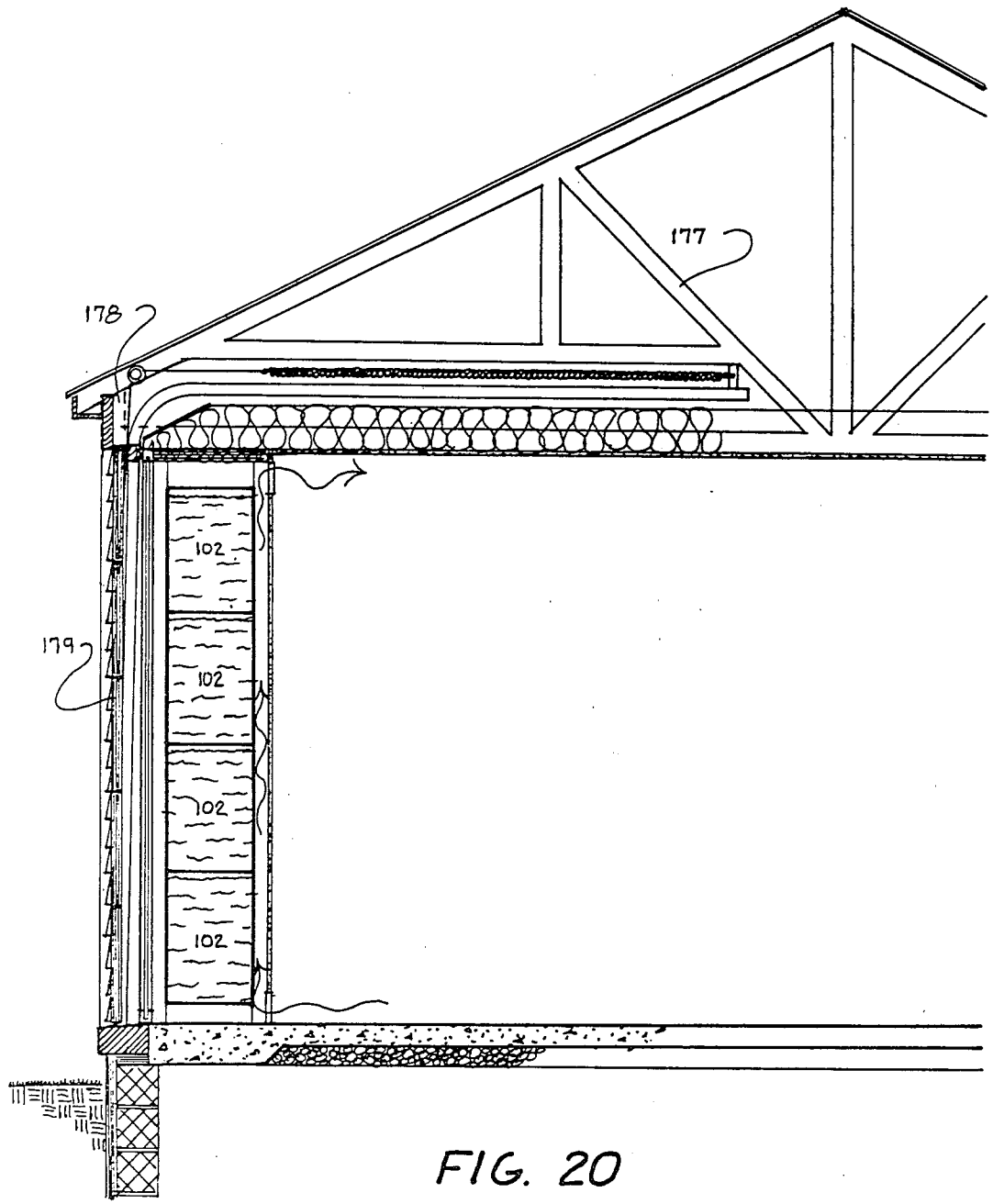
FIG. 20 is a fragmentary vertical sectional view on line 20–20 of FIG. 19, showing a novel partly prefabricated job site completed roof truss arrangement.

FIG. 20 is a fragmentary vertical sectional view on line 20–20 of FIG. 19, showing a novel partly prefabricated, job site completed roof truss arrangement. The roof truss 177 is normally made at the manufacturing site, with a complete web at 178. At the job site, after the building has been erected, and the installation of the exterior, raisable panel 179 is being completed, the web portions 178 (dashed line region) are merely sawn out, as shown; in order to permit the panel 179 to be raised. Typically, the panel 179 is constituted by an overhead garage door of conventional construction and mounting. It may supplement or replace the shade systems of FIGS. 11–15 in appropriate circumstances.

It should now be apparent that the environmentally driven heating and cooling system as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. In an environmentally driven heating and cooling system, which includes:

wall means defining at least two containers each for a quantum of thermal storage mass, each including surface means for collecting and radiating heat;

each said container in a use condition having a filling of said quantum of thermal storage mass;

a building structure for a situs, and including a glazed portion sited for sunlight to fall along a path directly or indirectly thereon;

said containers being deployed in a group in said building structure when in said use condition, behind said glazed portion, relative to the path of sunlight falling on said glazed portion;

the improvement wherein:

the at least two containers further have a shipping condition wherein the at least two containers lack said filling and are more condensed relative to one another than when grouped, so that while being shipped to said situs in said shipping condition, said at least two containers occupy less space than when grouped and in said use condition;

each container being an integrally molded unit made of synthetic plastic material and each includes sidewalls and a bottom cooperatively provided with a nesting feature and a stacking feature, so oriented that when two such containers are aligned and vertically juxtaposed in one congruent relationship, the upper one will nest in the lower one without the stacking feature of the lower one supporting the upper one, but when said two such containers are aligned and vertically juxtaposed in an opposite relationship, in which one is turned end-for-end relative to the other, the upper one will stack upon the lower one without substantial nesting.

2. Environmentally driven heating and cooling system improvement of claim 1, wherein:

each container includes a plurality of outwardly concave ribs in the sidewalls thereof and a perimetrical, out-turned flange at the top, each concave rib at the upper extent thereof having an upwardly facing support surface providing said stacking feature.

3. Environmentally driven heating and cooling system improvement of claim 2, wherein:

as a means for preventing sidewall spreading of the lower container, at least some of said support surfaces and the container bottoms include interdigitable detent features which, when interdigited between the upper container and the lower container prevent the sidewalls of the lower container from spreading outwards.

4. Environmentally driven heating and cooling system improvement of claim 3, wherein:

the interdigitable detent features include holes in said at least some support surfaces and feet on said container bottoms, arranged to socket in said holes.

5. Environmentally driven heating and cooling system improvement of claim 2, further including:

separate additional support rib units secured to the outsides of said lower container sidewalls so that each such unit occupies the site of a corresponding said outwardly concave rib.

6. For an environmentally driven heating and cooling system, wall means defining at least two containers each for a quantum of thermal storage mass, each including surface means for collecting and radiating heat when filled with said quanta and stacked with one another in a building structure behind a glazed portion of the building structure upon which sunlight will impinge, said at least two containers further having a shipping condition wherein the at least two containers lack said filling and are more condensed relative to one another than when stacked, so that while being shipped to another situs in said shipping condition, said at least two containers occupy less space than when stacked and in said use condition;

each container being an integrally molded unit made of synthetic plastic material, and each includes sidewalls and a bottom cooperatively provided with a nesting feature and a stacking feature, so oriented that when said two such containers are aligned and vertically juxtaposed in one congruent relationship, the upper one will nest in the lower one without the stacking feature of the lower one supporting the upper one, but when said two such containers are aligned and vertically juxtaposed in an opposite relationship, in which one is turned end-for-end relative to the other, the upper one will stack upon the lower one without substantial nesting.

7. Environmentally driven heating driven heating and cooling system improvement of claim 6, wherein:

each container includes a plurality of outwardly concave ribs in the sidewalls thereof and a perimetrical, out-turned flange at the top, each concave rib at the upper extent thereof having an upwardly facing support surface providing said stacking feature.

8. Environmentally driven heating and cooling system improvement of claim 7, wherein:

as a means for preventing sidewall spreading of the lower container, at least some of said support surfaces and the container bottoms include interdigitable detent feature which, when interdigited between the upper container and the lower container prevent the sidewalls of the lower container from spreading outwards.

9. Environmentally driven heating and cooling system improvement of claim 8, wherein:

the interdigitable detent features include holes in said at least some support surfaces and feet on said container bottoms, arranged to socket in said holes.

10. Environmentally driven heating and cooling system improvement of claim 7, further including:

separate additional support rib units secured to the outsides of said lower container sidewalls so that each such unit occupies the site of a corresponding said outwardly concave rib.

11. An environmentally driven heating and cooling system, which includes:

wall means defining a container for a quantum of thermal storage mass, including surface means for collecting and radiating heat when filled with said quantum;

said container having a use condition in which it is arranged and disposed to receive said quantum of said thermal storage mass and is arranged in a building structure behind a glazed portion of the building structure upon which sunlight will impinge;

said container having a shipping condition, wherein said container is nested with at least one like container and, in which, as a result of such nesting the at least two containers occupy less space than when de-nested and in said use condition;

said container being an integrally molded unit made of synthetic plastic material;

said wall means including sidewalls and a bottom cooperatively provided with a nesting feature and a stacking feature, so oriented that when said two such containers are aligned and vertically juxtaposed in one congruent relationship, the upper one will nest in the lower one without the stacking feature of the lower one supporting the upper one, but when said two such containers are aligned and vertically juxtaposed in an opposite relationship, in which one is turned end-for-end relative to the other, the upper one will stack upon the lower one without substantial nesting.

12. The environmentally driven heating and cooling system of claim 11, further including:

a thermal insulation device mounted adjacent the container and removably disposed facially of one face of said container;

said thermal insulation device comprising shade means and means for moving the shade between two conditions, in the first of which the shade means effectively blinds said container one face and in the second of which said one face is at least substantially less obstructed by said shade means.

* * * * *